United States Patent Office 3,573,093
Patented Mar. 30, 1971

3,573,093
METHOD FOR THE ANTISTATIC TREATMENT OF PLASTIC FILMS
Koji Oshibuchi, Masayoshi Mayama, Masao Ishihara, and Osakazu Sugino, Tokyo, Japan assignors to Konishiroku Photo Industry Co., Ltd.
No Drawing. Filed Mar. 8, 1968, Ser. No. 711,498
Claims priority, application Japan, Mar. 15, 1967, 42/15,870
Int. Cl. B32b 27/08
U.S. Cl. 117—138.8                    5 Claims

ABSTRACT OF THE DISCLOSURE

A plastic film is treated with a copolymer. The copolymer contains in the principal chain the recurring unit

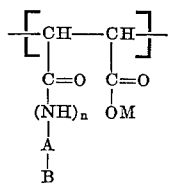

wherein A is a substituted phenylene, an unsubstituted phenylene, a naphthalene radical or a radical having the formula—CHR, R being hydrogen, a substituted alkyl, an unsubstituted alkyl or an aryl group, B is —$SO_3M$, —$SO_2M$, —COOM, —$PO_3M_2$ or —$PO_2M_2$, M is a cation and $n$ is 1 or 2. To produce the above copolymer, a copolymer comprising as its copolymerization component an $\alpha,\beta$-ethylenically unsaturated monomer and a maleic acid derivative is reacted with a compound which is capable of forming with the maleic acid derivative an acid amide linkage having at its terminal end a pendant acidic group.

---

This invention relates to a method for the antistatic treatment of plastic films and a new modified copolymer useful therein.

As is well known, plastic films are easily electrostatically charged by mechanical abrasion so that they may suffer from several disadvantages such as dust adhesion or electrical shock firing. In the production of a photographic film which is required to be highly clear, for example, dust is attracted to adhesion by the highly charged surface of the film. Sometimes, the formation of so-called static marks occurs as the result of electrostatic discharge on the said charged surface. Thus, the photographic film produced is remarkably degraded in its commercial value and sometimes it becomes unusable for its practical purpose.

Various attempts have been made heretofore to eliminate or reduce the tendency of a plastic film to be electrostatically charged. For example, it is well known that the static charge of a plastic film can be eliminated or reduced by reducing the surface specific resistance of said film. Accordingly, a variety of compounds have heretofore been used to treat plastic films in order to reduce the surface specific resistance thereof. In practice, however, none of said compounds can give any effect sufficient to attain the above object.

We have found that a copolymer comprising, as its copolymerization component, (a) a $\alpha,\beta$-ethylenically unsaturated monomer and (b) a maleic acid derivative can be modified so as to have in its principal chain the recurring unit of the following structural formula

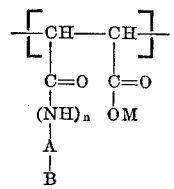

wherein A is a phenylene or naphthylene radical or a radical —CHR (in which R is hydrogen, an alkyl or aryl group), B is —$SO_3M$, —$SO_2M$, —COOM, —$PO_3M_2$ or —$PO_2M_2$ M is a cation, and $n$ is an integer of 1 or 2. Further, it has been found that the modified copolymer thus obtained is very useful as an antistatic agent for various plastic films.

Accordingly, it is one object of this invention to provide a new modified copolymer which has never been disclosed in the prior art literatures. Another object of this invention is to provide a method for treating a plastic film with said modified copolymer thereby to impart antistatic effect to said film.

For the purpose of the present invention, the modified copolymer should contain in its principal chain the recurrent unit of the above-indicated general structure which is characterized by the presence of an acid amide linkage having at its terminal end a pendant acidic group. The expression, "a pendant acidic group," used herein should be understood as meaning that an acidic group is connected through a phenylene or naphthylene radical or through an alkylene radical to the acid amide linkage.

Such modified copolymer as mentioned above can be prepared by the reaction of a copolymer comprising (a) $\alpha,\beta$-ethylenically unsaturated monomer and (b) maleic acid derivative with an appropriate modifying compound capable of forming, with said maleic acid derivative, an acid amide linkage having at its terminal end a pendant acidic group. The term, "$\alpha,\beta$-ethylenically unsaturated monomer," used herein is to be understood to include vinyl alcohol, vinyl acetate, styrene, acrylic and methacrylic acids, etc. Suitable maleic acid derivative which is another copolymerization component may be maleic anhydride or maleic acid amide. As will be understood for those skilled in the art, the parent copolymer may be modified wholly or partly. In either case, it is very surprising that the modified copolymer can show excellent antistatic activity whereas the parent copolymer is inactive.

Concrete examples of typical modified copolymers to be used in the present invention are as follows (in the formulas, $m$ and $m_1$ show polymerization degrees):

(1)
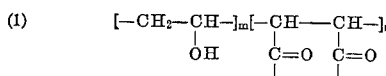
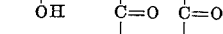
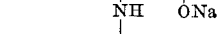
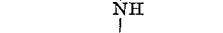
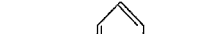
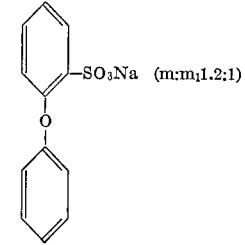

(2) 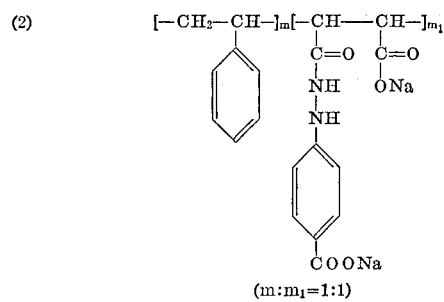
(m:m₁=1:1)
(3) 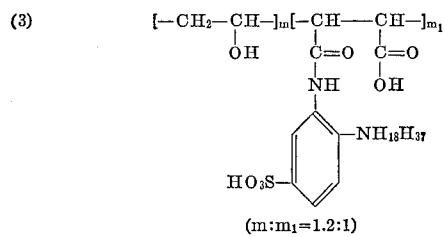
(m:m₁=1.2:1)
(4) 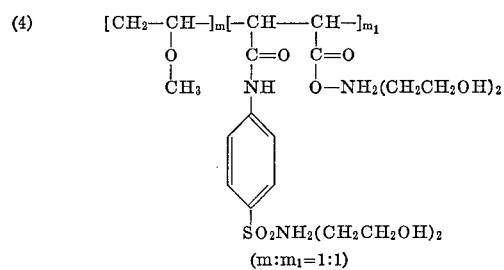
(m:m₁=1:1)
(5) 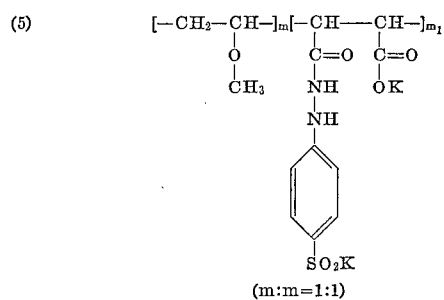
(m:m=1:1)
(6) 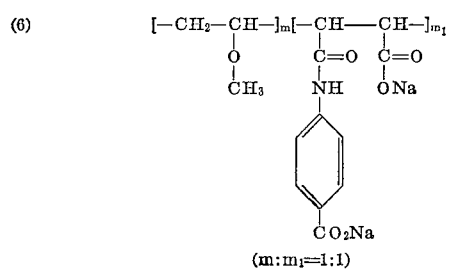
(m:m₁=1:1)
(7) 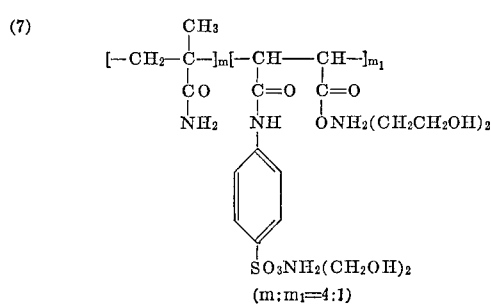
(m:m₁=4:1)
(8) 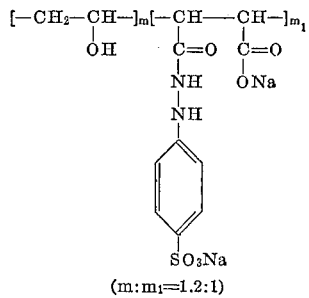
(m:m₁=1.2:1)
(9) 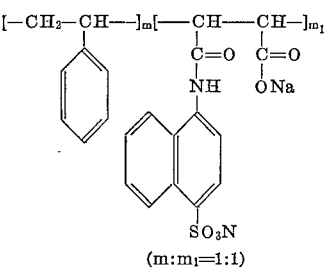
(m:m₁=1:1)
(10) 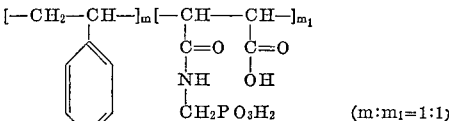   (m:m₁=1:1)
(11) 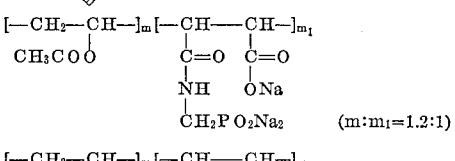   (m:m₁=1.2:1)
(12) 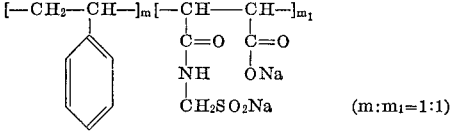   (m:m₁=1:1)
(13) 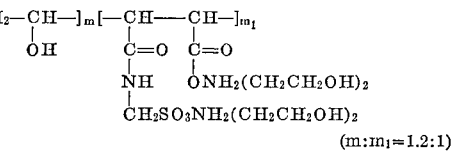
(m:m₁=1.2:1)
(14) 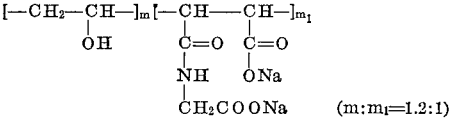   (m:m₁=1.2:1)
(15) 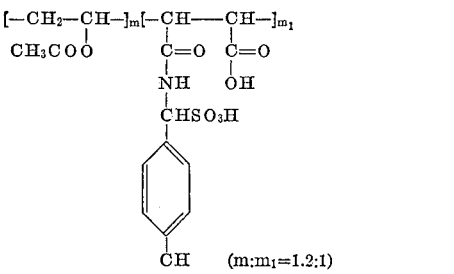
(m:m₁=1.2:1)
(16) 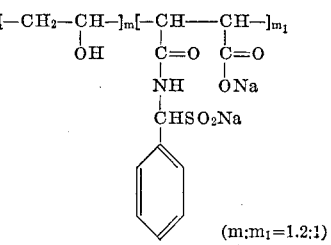
(m:m₁=1.2:1)

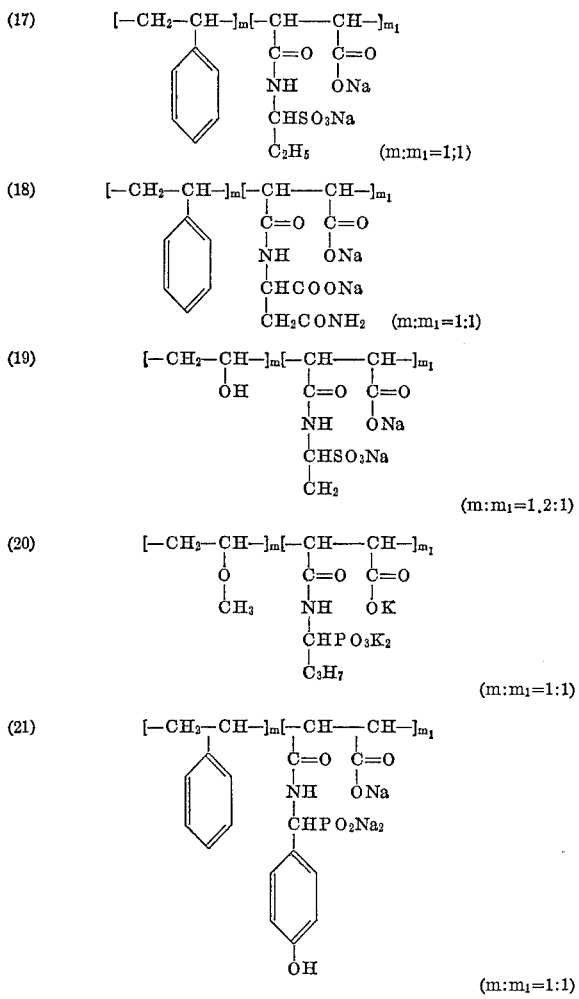

Typical examples for synthesizing the above-mentioned modified copolymers are shown below.

SYNTHESIS EXAMPLE 1

Vinyl acetate-maleic anhydride copolymer (Intrinsic viscosity 0.84 in 1% acetone solution at 18° C.)—18.6 g.
Sodium 4-phenoxyphenylhydrazine-3-sulfonate—28 g.
Water—200 cc.
Anhydrous sodium anhydride—5.4 g.

A mixture comprising the above compounds was heated over a water bath for 30 minutes and was then cooled. Subsequently, the mixture was made alkaline by addition of 10.6 g. of anhydrous sodium carbonate and was then filtered. The filtrate was diluted with 1 l. of methanol and was then salted out by means of 10 cc. of an aqueous sodium chloride solution to deposit a blue viscous resin. The resin was decanted, was washed with 500 cc. of methanol and was then dried under reduced pressure to obtain 34.8 g. of a bluish resin. This product is the copolymer exemplified in the aforesaid item (1).

SYNTHESIS EXAMPLE 2

Styrene-maleic anhydride copolymer (Intrinsic viscosity 0.74 in 0.8% acetone solution at 18° C.)—20 g.
p-Carboxyphenylhydrazine—15.2 g.
Anhydrous sodium carbonate—16 g.
Water—200 cc.

A mixture comprising the above compounds was reacted at 40° C. for 1 hour and was then heated over a water bath for 30 minutes to obtain a transparent solution. This solution was diluted with 1 l. of methanol and was salted out by use of 30 cc. of an aqueous sodium chloride solution, and the deposit was washed with methanol and was then dried to obtain 71.5 g. of the copolymer exemplified in the aforesaid item (2).

SYNTHESIS EXAMPLE 3

Vinyl methyl ether-maleic anhydride copolymer "Gantretz" AN–169 commercially available from General Anilin & Film Corp., U.S.A.—15.6 g.
p-Aminobenzoic acid—13.7 g.
Anhydrous sodium carbonate—5.4 g.
Water—200 cc.

A mixture comprising the above compounds was stirred at room temperature for 30 minutes and was then reacted over a water bath until the mixture became a transparent viscous solution. After cooling, the solution was adjusted to pH 7.5 by addition of 10.6 g. of anhydrous sodium carbonate, was diluted with 1 l. of methanol, and was then salted out by use of 50 cc. of an aqueous sodium chloride solution to deposit a fibrous resin. This resin was recovered by filtration, was washed with 50 cc. of methanol, and was then dried to obtain the copolymer exemplified in the aforesaid item (6).

SYNTHESIS EXAMPLE 4

Methacrylamide-maleic anhydride copolymer (Intrinsic viscosity 0.56 in 1% acetone soln. at 18° C.)—21.9 g.
p-Sulfanylic acid—13.7 g.
Water—200 cc.

A mixture comprising the above compounds was reacted at an elevated temperature for 5 hours. Subsequently, the mixture was added with 10.6 g. of diethanolamine and was further reacted at an elevated temperature for 1 hour. After cooling, the reaction mixture was diluted with 1 l. of methanol and was salted out by use of 50 cc. of an aqueous sodium chloride solution. The resulting deposit was washed with methanol and was then dried at 50° C. to obtain the copolymer exemplified in the aforesaid item (7).

SYNTHESIS EXAMPLE 5

Styrene-maleamic acid copolymer (Intrinsic viscosity 0.74 in 1% acetone soln. at 18° C.)—10.8 g.
Water—150 cc.
Anhydrous sodium carbonate—2.8 g.

The above compounds were mixed together over a water bath, and the resulting solution was neutralized with acetic acid to precipitate a white resin. This resin was recovered by filtration, was washed with water, and was added with a solution of 6 g. of hydroxymethanephosphoric acid in 50 cc. of water. After stirring, the mixture was further added with 60 cc. of a 1 N aqueous caustic soda solution and was heated for 1 hour. Thereafter, the mixture was cooled and was acidified with dilute hydrochloric acid to deposit a white resin. This resin was recovered by filtration, was washed with water, and was then dried under reduced pressure to obtain 10.6 g. of the copolymer exemplified in the aforesaid item (10).

SYNTHESIS EXAMPLE 6

Vinyl acetate-sodium maleamate copolymer (Intrinsic viscosity 41.60 in 1% aqueous soln. at 18° C.)—12 g.
Water—200 cc.

A mixture comprising the above compounds was allowed to stand overnight, and was added with 8.5 g. of sodium hydroxymethane phosphinate. The reaction was carried out at room temperature for 1 hour, and further over a water bath at 70° C. for additional 1 hour. After cooling, the mixture was poured into methanol to deposit a white resin. This resin was washed with methanol and was then dried at 50° C. to obtain 10 g. of the copolymer exemplified in the aforesaid item (11).

SYNTHESIS EXAMPLE 7

Styrene-sodium maleamate copolymer (Intrinsic viscosity 16.74 in 1% aqueous soln. at 18° C.)—12 g.
Water—100 cc.
Methanol—50 cc.

The above compounds were mixed together, and the resulting solution was added with a solution of 8 g. of sodium hydroxypropyl sulfonate in 50 cc. of water. The mixed solution was reacted at 70° C. for 1 hour, was diluted with 1 l. of methanol, and was salted out by use of 50 cc. of an aqueous sodium hydrochloride solution. After recovering by filtration, the deposit was washed with methanol and was dried at 50° C. to obtain the copolymer exemplified in the aforesaid item (17).

SYNTHESIS EXAMPLE 8

Vinyl methyl ether-potassium maleamate copolymer—21 g.
Water—200 cc.

The above compounds were mixed together, and the resulting solution was added with a 30% aqueous solution of 24 g. of potassium hydroxy-α-propylmethyl phosphinate. Subsequently, the mixed solution was reacted with stirring for 4 hours over a water bath at 70° C. After cooling, the reaction liquid was poured into methanol. The deposit formed was decanted, was washed with methanol, and was then dried to obtain a white resin, which was the copolymer exemplified in the aforesaid item (20).

In accordance with the present invention, one or more of the above mentioned copolymers is dissolved in a suitable solvent, e.g. water or an organic solvent, or a mixture thereof, to form a solution at a concentration of about 0.01 to 10%, and the solution is used to treat various plastic films desired to be made antistatic, such as cellulose triacetate films, polycarbonate films, polyester films and the like.

As the treatment method, any of coating, spraying, dipping and the like methods is effective so far as said solution is coated onto the surface of a plastic film. In the case of photographic plastic films, the treatment in accordance with the present invention may not only be applied directly to the films but also may effectively be applied to films coated with antihalation layers or sublayers. Further, developed films may be treated in order to protect the final products from dust.

If necessary, the treating liquids of the present invention may be incorporated with plasticizers, antioxidants, colorants and the like assistants.

The following examples illustrate the invention.

Example 1

2 g. of the copolymer exemplified in item (1) (prepared according to Synthesis Example 1) was dissolved in 50 cc. of water. The solution was diluted with 250 cc. of methanol and 700 cc. of acetone, and the mixture was applied onto the surface of a cellulose triacetate film and was then dried. The surface specific resistivity of the thus treated film was $1.7 \times 10^9 \Omega$ at 25° C. under a relative humidity of 50%. In contrast thereto, the surface specific resistivity of an untreated cellulose triacetate film was more than $10^{15} \Omega$.

Example 2

A cellulose triacetate film was dipped in a heated 10% aqueous caustic soda solution and was then washed with water to obtain a cellulose triacetate film having a saponified layer on the surface. To this film was applied a treating liquid prepared by dissolving 2 g. of the copolymer exemplified in item (2) (prepared according to Synthesis Example 2) in 500 cc. of water and adding thereto 500 cc. of methanol, and then the liquid was dried. The surface specific resistivity of the thus treated film was $4.0 \times 10^8 \Omega$ at 25° C. under a relative humidity of 50%, whereas that of an untreated film was $10^{12} \Omega$.

Example 3

1 g. of the coplymer exemplified in item (3) was dissolved in 600 cc. of methanol, and the solution was added with 1400 cc. of acetone to prepare a treating liquid. This treating liquid was sprayed onto a polycarbonate film and was then dried. The surface specific resistivity of the thus treated film was $1.2 \times 10^9 \Omega$, whereas that of an untreated film was more than $10^{15} \Omega$.

Example 4

20 g. of the copolymer exemplified in item (4) was dissolved in 200 cc. of methanol, and the solution was added with 200 cc. of phenol and 700 cc. of ethylene chloride to prepare a treating liquid. This treating liquid was applied onto a polyethylene terephthalate film and was then dried. The surface specific resistivity of the thus treated film was $6.2 \times 10^9 \Omega$ at 25° C. under a relative humidity of 50%, whereas that of an untreated film was more than $10^{15} \Omega$.

Example 5

Example 3 was repeated, except that 1 g. of the copolymer exemplified in item (10) was used in place of the copolymer exemplified in item (3). The surface specific resistivity of the treated film was $9.2 \times 10^9 \Omega$ at 25° C. under a relative humidity of 50%.

Example 6

Example 2 was repeated, except that the copolymer exemplified in item (12) was used in place of the copolymer exemplified in item (2). The surface specific resistivity of the treated film was $6 \times 10^8 \Omega$ at 25° C. under a relative humidity of 50%.

Example 7

Example 4 was repeated, except that the copolymer exemplified in item (13) was used in place of the copolymer exemplified in item (4). The surface specific resistivity of the treated film was $3.6 \times 10^9 \Omega$ at 25° C. under a relative humidity of 50%.

What we claim is:

1. A method for the antistatic treatment of a plastic film, characterized in that the plastic film is coated with a composition consisting essentially of a copolymer containing in the principal chain a recurring unit of the general formula

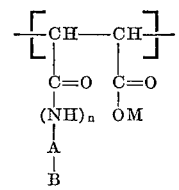

wherein A is a substituted or unsubstituted phenylene or naphthylene radical or a radical —CHR, where R is hydrogen or a substituted or unsubstituted alkyl or aryl group; B is —$SO_3M$, —$SO_2M$, —COOM, —$PO_3M_2$ or —$PO_2M_2$; M is a cation; and $n$ is an integer of 1 or 2.

2. A method for the antistatic treatment of a plastic film as claimed in claim 1, wherein said plastic film is a photographic film.

3. A method for the antistatic treatment of a plastic film as claimed in claim 1, wherein said copolymer is obtained by the reaction of a copolymer comprising, as its copolymerization component, an α,β-ethylenically unsaturated monomer and a maleic acid derivative with a compound capable of forming, with said maleic acid derivative, an acid amide linkage having at its terminal end a pendant acidic group.

4. A method as described in claim 1 wherein said cation is selected from the group consisting of sodium, potassium, hydrogen and alkanolamine.

5. A method as described in claim 4 wherein said alkanolamine is diethanolamine.

References Cited

UNITED STATES PATENTS 3,446,651   5/1969   Clachan et al. _____ 117—145

MURRAY KATZ, Primary Examiner

J. E. MILLER, Assistant Examiner

U.S. Cl. X.R.

96—119; 117—145; 260—78, 78.5